Aug. 4, 1942.  A. N. HEITERS  2,292,321
TRACTION WHEEL
Filed Nov. 30, 1939
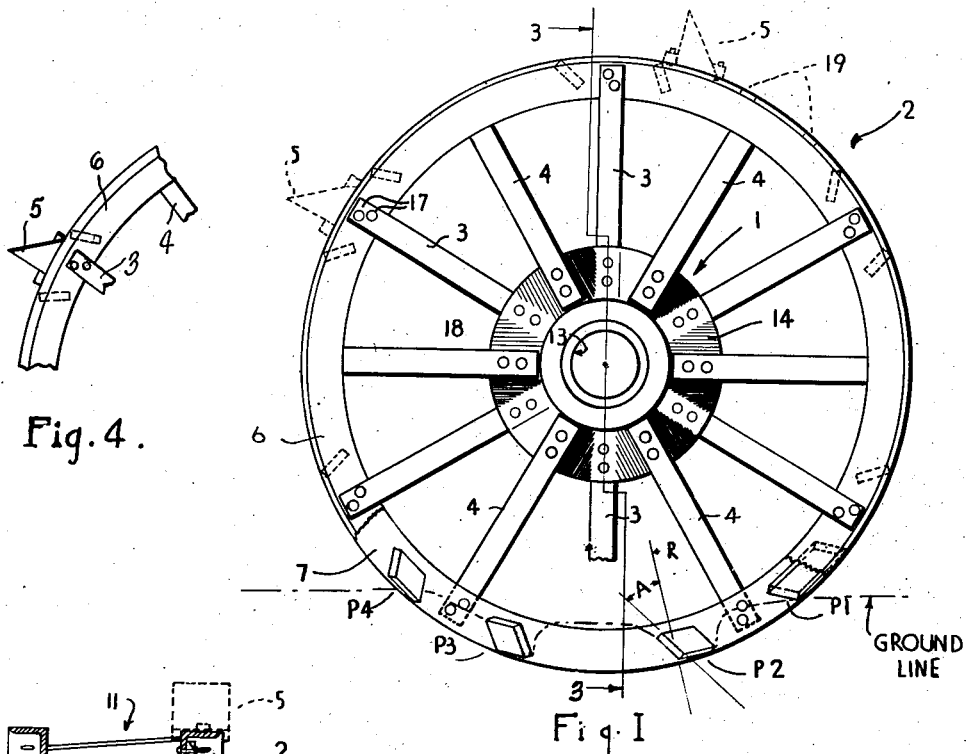
Fig. 4.
Fig. I
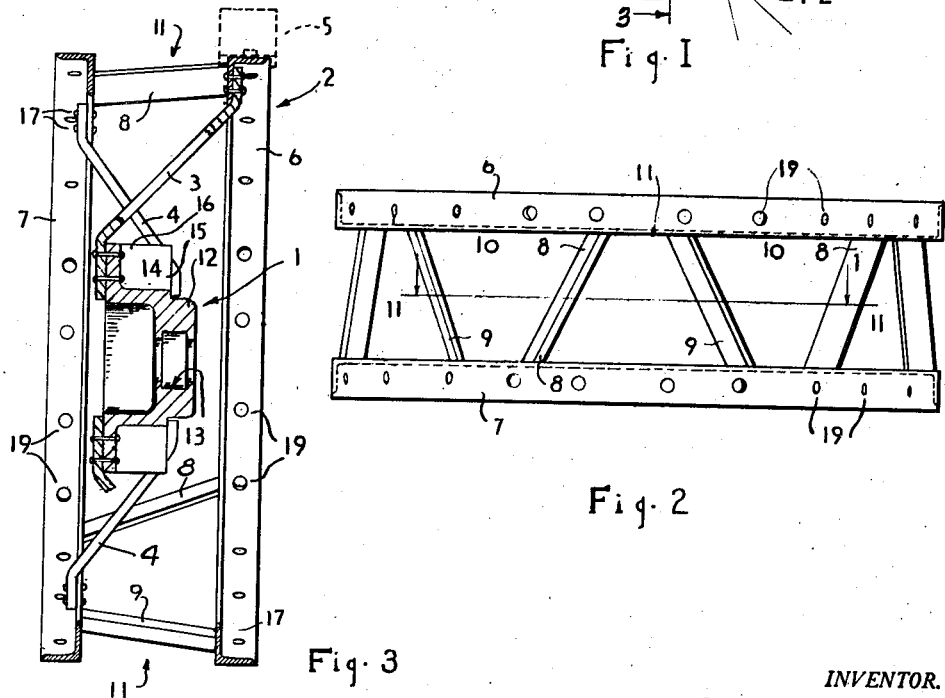
Fig. 3
Fig. 2
INVENTOR.
August N. Heiters
BY Emerson B. Donnell
ATTORNEY Patented Aug. 4, 1942

2,292,321

UNITED STATES PATENT OFFICE 2,292,321

TRACTION WHEEL

August N. Heiters, Calgary, Alberta, Canada, assignor to J. I. Case Company, Racine, Wis., a corporation Application November 30, 1939, Serial No. 306,894

5 Claims. (Cl. 301—52)

The present invention relates to traction means, and more particularly to wheels for a wheel type tractor. The particular wheel of this invention, although adaptable for substantially any purpose for which a metal tractor wheel is ordinarily useful, is particularly adapted to conditions where either the ordinary metal wheel or the rubber tired wheel is unsuitable. Examples of such conditions are those including extremely sticky mud and also conditions of loose sand, although it is not intended to limit the application of the invention to these conditions or in fact in any manner except as defined by the claims.

An object of the invention is to generally improve the construction and operation of tractor wheels of this class.

Further objects are to provide a traction wheel of all metal construction which will be efficient in obtaining traction in loose soil; which will avoid digging into such soil; which will be to a large extent self-cleaning under conditions of extremely sticky soil; which is adapted to be modified by the attachment of traction lugs to suit various conditions after the manner of known traction wheels and which is sturdy and durable and economical to manufacture.

In the drawing,

Figure 1 is a side elevation of a wheel embodying the invention, partly in section, on the line 1—1 of Fig. 2.

Fig. 2 is a bottom view of the wheel, illustrated in Fig. 1, with certain parts omitted to avoid confusion.

Fig. 3 is a sectional view of the wheel taken on the line 3—3 in Fig. 1 with parts removed to avoid confusion.

Fig. 4 is a side elevation of a portion of the wheel showing a traction lug which may be used under certain conditions.

The wheel comprises generally a hub portion 1 and a rim portion 2, connected by a series of spokes 3—3 and 4—4, the rim being adapted to carry a series of traction lugs 5—5 of suitable or well-known type, if desired, although it is contemplated that the wheel may be used and in fact it is adapted for use under certain conditions without such auxiliary traction lugs.

It has been the experience with metal tractor wheels in the past that any type of solid rim will pick up sticky soil until the usual lugs are completely imbedded and prevented from engaging the ground. In the present wheel, this is avoided by a self-cleaning action.

For this purpose rim 2 in the present embodiment is an open work structure including rim members or rings 6 and 7, in the present instance formed as angle irons shaped into circles as clearly apparent from Figs. 1 and 3, although other cross sections for the rim portions are contemplated. Members 6 and 7 are spaced apart as seen in Figs. 2 and 3 and connected by braces or ground engaging elements 8—8 and 9—9, providing therebetween openings as 10 and 11. As the wheel rolls in sticky soil, openings 10 and 11 will tend to fill with dirt, but each successive contact of any given rim portion with the ground will tend to force any accumulation of soil out of the openings and toward hub 1, thus allowing the wheel to settle into the soil sufficiently for elements 8 and 9 to obtain a footing on new ground, as opposed to that picked up by the wheel.

In the past in prior open type wheels, a similar action has resulted in the building up of a body of soil within the wheel until the wheel was completely full, thereafter the soil building up on the periphery, supported by the accumulation inside, and destroying the traction. In the present instance, means is provided for deflecting material so entering the wheel and insuring that it will move through and out of the wheel to avoid building up any such solid body as will support the weight of the wheel and tractor and prevent engagement of the traction lugs 5 or braces 8 with the ground. Any suitable deflecting means may be used, but in the present embodiment spokes 3 and 4 are so disposed as to serve this purpose in addition to their ordinary function of supporting the hub 1 within the rim 2.

Hub 1 includes a sleeve portion 12 having a bore 13 of any suitable configuration for engagement with a tractor or other axle not shown. Sleeve 12 in the present instance carries a web or flange 14 and including a front portion 15 and a rear portion 16 of any suitable or desired configuration for engaging spokes 3 and 4. Each opening 11 has a spoke 3, engaged with rim member 6 adjacent thereto and passing diagonally across toward inner portion 16 of hub 12, while openings 10 each have a spoke 4 adjacent thereto and extending from rim member 7 toward outer portion 15 of hub 1. This not only gives a very sturdy and stable construction after the manner of the well-known "wire" wheel, but also the spokes themselves serve as guiding members, spokes 3 deflecting any material entering openings 11—11 inwardly of the wheel and spokes 4—4 deflecting such material entering openings 10 outwardly of the wheel away from the tractor. Spokes 3 and 4 are engaged with rim members 6 and 7 in any suitable manner as for example by rivets 17—17, and are engaged in any suitable manner as by rivets 18—18 with portions 15 and 16 of hub 1.

From the description thus far, it will be understood that the traction may be obtained with the braces 8 and 9 under certain conditions and that soil is prevented from building up within the wheel and destroying such traction. Furthermore, when conditions require the use of traction lugs 5—5, soil is prevented from building up on rim 2 and imbedding lugs 5 and destroying their traction.

To realize the ultimate advantage of the invention, braces 8 and 9 are preferably inclined as follows, although, as will be apparent from the above, numerous advantages are realized from the construction without resorting to any specific positioning of said braces.

In certain soils there is a tendency for known types of traction wheels to penetrate more deeply than desired, digging themselves into the soil and preventing further progress. This tendency is corrected in the present invention as clearly shown in Fig. 1, by inclining braces 8 and 9 at an angle $a$ to a radius R of the wheel; or in other words rearwardly to the direction of progress of the wheel when the braces are on or near the ground. This results in a definite tendency to lift the wheel as it proceeds forwardly, the braces engaging the ground at position $p1$ to exert a direct lifting action on the wheel, at $p2$ exerting a combined lifting and propelling force as will be apparent, at $p3$ exerting almost a pure propelling force and at $p4$ rising edgewise out of the ground with very little tendency to lift the soil or urge the wheel downwardly.

With the use of auxiliary lugs 5—5, braces 8 and 9 often do not contact the ground, but when a soft spot in the field is encountered, or when the condition of a field permits lugs 5—5 to penetrate to the point where in prior practice soil would start to build up on the wheel and destroy traction, braces 8 and 9 will contact the ground and operate as above described to prevent substantial further penetration and maintain or assist lugs 5—5 in maintaining traction. The self-cleaning feature of the open work rim and inclined spokes, of course, assists in preventing failure of traction as above described.

For still further assisting the cleaning action and improving traction, braces 8 in addition to being inclined rearwardly, as indicated in Fig. 1, are also inclined axially or in a spiral direction, or in other words, oblique to the elements of a cylinder defined by rim portions 6 and 7. In the present instance braces 8 are inclined in a clockwise direction looking from the tractor outwardly. In a similar manner, alternate braces 9 are inclined in a counter-clockwise direction so that spaces 11 have roughly the configuration of a trapezoid with the long side toward the tractor and the short side away from the tractor. Conversely spaces 10 have the configuration of a trapezoid with the short side toward the tractor and the long side away therefrom. Preferably, although not necessarily, spokes 3 are connected to rim 6 approximately at the middle of the short sides of openings 11, while spokes 4 are similarly connected to rim member 7 opposite the middle portions of the short sides of openings 10. Owing to the slanted or spiral disposition of the braces, they present somewhat more length to the ground for traction purposes than they would if placed perpendicularly to rim portions 6 and 7. Furthermore, the long sides of openings 10 and 11 are substantially greater in extent than they would be with the same number of braces arranged either perpendicularly to rim portions 6 and 7 or all spiralled in the same direction. The span of material tending to fill openings 10 and 11 is too great adjacent the long sides of the openings, for the material to maintain itself under the downward pressure of the tractor as a given opening encounters a new spot in the ground as the wheel rolls. As a result, at least part of the material is pushed out of the opening and the remaining material follows much more easily without the support of this first material than would be the case if the openings were uniform in extent and the material had to be displaced in a body.

Rims 6 and 7 are provided with holes 19—19 or other suitable or well-known expedients for attaching traction lugs 5—5. Braces 8 and 9 may be secured in any suitable manner between rim members 6 and 7 as by welding, riveting, or the like.

A desirable feature of the invention is that the rim portions 6 and 7 in the present embodiment are smooth and continuous so that the wheel may operate on a paved highway without damage to itself or the highway, and without discomfort to the operator of the tractor. Braces 8 and 9 are arranged preferably with their edges flush with the outer surfaces of rim portions 6 and 7 so as not to contact the pavement, although the invention is not limited to this arrangement. Furthermore, with or without auxiliary lugs 5—5 there is no wide solid rim to abruptly limit the penetration of the wheel into the soil. As a result the riding of the wheel and tractor in ordinary field work compares favorably with that of rubber tire equipment.

The operation of the wheel is thought to be clearly apparent from the preceding description which is to be understood to be exemplary rather than restrictive.

What is claimed as new and desired to be secured by Letters Patent of the United States is:

1. In a tractor wheel, inner and outer spaced rim members and a hub having inner and outer portions, a series of spokes extending from the hub to the rim members, certain of said spokes extending from the outer portion of the hub to the inner rim member and the remaining spokes extending from the inner portion of the hub to the outer rim member, and a series of braces extending between the rim members to engage the ground, said braces and rim members defining a rim for the wheel having a plurality of openings so spaced as to correspond with the junctures of said spokes with the rim whereby material forced through any opening will be deflected by a spoke and guided away from the hub and out of the wheel.

2. In a tractor wheel, inner and outer spaced rim members and a hub having inner and outer portions, a series of spokes extending from the hub to the rim members, alternate spokes extending from the outer portion of the hub to the inner rim member and the remaining spokes extending from the inner portion of the hub to the outer rim member, and a series of braces extending between the rim members to engage the ground, said braces and rim members defining a rim for the wheel having a plurality of openings, each opening having one of said spokes extending substantially from the center of one side thereof, whereby material forced through adjacent openings will be deflected out of the wheel by said spokes, alternately toward opposite sides of the wheel.

3. In a tractor wheel, inner and outer spaced rim members and a hub having inner and outer portions, a series of spokes extending from the hub to the rim members, alternate spokes extending from the outer portion of the hub to the inner rim member and the remaining spokes extending from the inner portion of the hub to the outer rim member, and a series of braces extending between the rim members to engage the ground, said braces and rim members defining a rim for the wheel having a plurality of openings, said braces being so disposed between said rim members that the ends thereof where they join the rim members are spaced from each other at varying distances so as to define openings having opposite sides of different lengths, and said braces being located so that said spokes where they join the rim members in each instance are adjacent the shorter sides of said openings.

4. In a tractor wheel, inner and outer spaced rim members and a hub having inner and outer portions, a series of spokes extending from the outer portion of the hub to the inner rim member, and the remaining spokes extending from the inner portion of the hub to the outer rim member, and a series of braces extending between the rim members to engage the ground, said braces being inclined rearwardly in the direction of rotation of the tractor wheel, and said braces and rim members defining a rim for the wheel having a plurality of openings, each opening having one of said spokes extending from a rim member at substantially the center of one side thereof, whereby material forced through adjacent openings will be deflected out of the wheel by said spokes, alternately toward opposite sides of the wheel.

5. In a tractor wheel, inner and outer spaced rim members, and a hub having inner and outer portions, a series of spokes extending from the hub to the rim members, alternate spokes extending from the outer portion of the hub to the inner rim member, and the remaining spokes extending from the inner portion of the hub to the outer rim member, and a series of braces extending between the rim members to engage the ground, said braces being inclined rearwardly in the direction of rotation of the tractor wheel, said braces and rim members defining a rim for the wheel having a plurality of openings, and said braces being so disposed between said rim members that the ends thereof where they join the rim members are spaced from each other at varying distances so as to define openings having opposite sides of different lengths, and said braces being located so that said spokes where they join the rim members in each instance are adjacent the shorter sides of said openings.

AUGUST N. HEITERS.